United States Patent [19]

Dufresne et al.

[11] Patent Number: 6,077,803
[45] Date of Patent: *Jun. 20, 2000

[54] PROCESS FOR OFF-SITE PRECONDITIONING OF A HYDROCARBON PROCESSING CATALYST

[75] Inventors: Pierre Dufresne, Valence; Nilanjan Brahma, La Voulte sur Rhone, both of France

[73] Assignee: Europeene de Retraitment de Catalyseurs, France

[*] Notice: This patent issued on a continued prosecution application filed under 37 CFR 1.53(d), and is subject to the twenty year patent term provisions of 35 U.S.C. 154(a)(2).

[21] Appl. No.: 08/769,513

[22] Filed: Dec. 19, 1996

[30] Foreign Application Priority Data

Nov. 13, 1996 [FR] France .................................. 96 13798

[51] Int. Cl.$^7$ ............................. B01J 20/34; B01J 38/60; B01J 27/02
[52] U.S. Cl. ................................. 502/33; 502/27; 502/29; 502/168; 502/216
[58] Field of Search .................. 502/27, 29, 33, 502/168, 216

[56] References Cited

U.S. PATENT DOCUMENTS

| | | | |
|---|---|---|---|
| 2,232,909 | 2/1941 | Gohr et al. ........................ | 196/53 |
| 2,402,683 | 6/1946 | Kerr ................................. | 252/228.4 |
| 4,177,162 | 12/1979 | McDaniel et al. ................. | 252/439 |
| 4,277,587 | 7/1981 | McDaniel et al. ................. | 526/106 |
| 5,041,404 | 8/1991 | Seamans et al. .................. | 502/150 |
| 5,397,756 | 3/1995 | Dufresne et al. .................. | 502/33 |
| 5,681,787 | 10/1997 | Seamans et al. .................. | 502/33 |

FOREIGN PATENT DOCUMENTS

| | | |
|---|---|---|
| 2272 | 12/1978 | European Pat. Off. . |
| 0 359 356 | 3/1990 | European Pat. Off. . |
| 0 517 555 | 12/1992 | European Pat. Off. . |
| 0 530 068 | 3/1993 | European Pat. Off. . |
| 0 707 890 | 4/1996 | European Pat. Off. . |
| 1349022 | 3/1963 | France . |
| 2149429 | 8/1972 | France . |
| 94/25157 | 11/1994 | WIPO . |

*Primary Examiner*—John F. Niebling
*Assistant Examiner*—Alexander G. Ghyka
*Attorney, Agent, or Firm*—Millen, White, Zelano & Branigan, P.C.

[57] ABSTRACT

A process for presulfurizing a refining catalyst or petrochemical catalyst consists of bringing a catalyst into contact with liquid elementary sulfur or elementary sulfur dissolved in a liquid, preferably another sulfur compound such as an organic polysulfide, in the presence of a stabilizing agent, e.g., a fatty acid, mercaptan or alcohol.

17 Claims, No Drawings

PROCESS FOR OFF-SITE PRECONDITIONING OF A HYDROCARBON PROCESSING CATALYST

BACKGROUND OF THE INVENTION

It is often desirable to perform sulfuration (generally called "presulfuration or sulfurizing") of metals that fall within the composition of certain refining catalysts and/or hydrocarbon hydroconversion catalysts, either when these catalysts are new or at the end of the regeneration of these catalysts before they are reused.

Presulfurizing fresh or regenerated catalysts is thus desirable in order to use these catalysts in refining reactions, for example, the reactions of hydrotreating or hydrodesulfurizing or hydrocracking of various petroleum fractions whose sulfur content has to be reduced or whose other characteristics are to be improved before use.

Thus, in the prior art, the catalyst, fresh or regenerated, before being used, was generally subjected to sulfuration (presulfuration) that was carried out in a hydrodesulfuration reactor. This sulfuration makes it possible to include in the catalyst, for example, about 50 to 110% of the stoichiometric amounts of sulfur that are calculated based on the following chemical formulas $Co_9S_8$, $MoS_2$, $WS_2$ and $Ni_3S_2$.

The regeneration of catalysts is now being done more and more by someone specialized in catalyst regeneration, sometimes in a different site from the industrial unit. It seems reasonable, however, to consider returning to the refiner a product that is ready for use; this is done in order to make possible the efficient process of the applicant's European patent EP-B,130850 (or U.S. Pat. No. 4,530,917), in which a sulfurated compound is incorporated into the catalytic compound and said compound causes the sulfuration or presulfuration of the catalyst when, later, the catalyst is brought into contact with hydrogen in the reaction zone (zone for treating the batch) or in the immediate vicinity of the reaction zone.

More specifically, in the applicant's European Patent No. EP-B-130850 or U.S. Pat. No. 4,530,917 (process called SULFICAT), the process of sulfuration of the catalyst is therefore characterized by a so-called preliminary stage for incorporation of a sulfur-containing compound of a special nature into the catalytic compound.

The preliminary stage of introducing a sulfur-containing compound, which is arbitrarily called "off-site" or "ex-situ" pretreatment, whether it is carried out close to the site of the industrial unit or more or less geographically distant from the industrial unit (where the catalyst has been regenerated or where it was produced, for example), is no longer performed, in any case, in the immediate vicinity of the reactor ("in situ" is written arbitrarily), i.e., at the reactor heads or in zones that are more or less in direct communication with these reactors, thus requiring operations to be performed under operating conditions (of temperature, pressure or the like) that are imposed at least in part by the operating conditions of the reactors themselves or attachments to these reactors (preliminary hydrogenation zone of the catalyst, for example).

In short, the applicant's European Patent EP-8-130850 relates to a process (which is thus called SULFICAT that makes it possible, (when the catalyst will be subjected from start-up, preferably on site ("in situ"), to the standard activation reaction in the presence of hydrogen, above 100° C., and then thanks to the presence of hydrogen on the site), to undertake the sulfuration at the required rate, stoichiometric or non-stoichiometric, of the active metal or active metals that are part of the composition of the catalyst. The process consists in incorporating at least one organic polysulfide into the pores of the fresh or regenerated catalyst in the absence of hydrogen.

The sulfuration of the catalyst can thus be done as follows: in a first stage, which is performed "ex-situ," with no hydrogen, the catalyst is treated by means of the sulfurizing agent to incorporate this agent partially or totally into the pores of the catalyst, with said sulfurizing agent being used in solution in a solvent; in a second stage, which is performed "in situ" and preferably at temperatures above 150° C., an activation stage of the catalyst that is carried out with hydrogen is initiated, with the required amount of sulfur being fixed thanks to the presence of hydrogen on the metal or metals that are part of the composition of said catalyst.

The technique that is described above has been improved in Patent EP-B-181,254 or U.S. Pat. No. 4,719,195. The object of these two patents is to carry out the presulfuration of the catalysts "ex situ" by incorporating all of the sulfur required and only the amount of sulfur required by the user. The catalysts are therefore supplied to the refinery or any other unit preconditioned for sulfuration.

The presulfurizing agent therein was an organic polysulfide. Di-tert-dodecylpolysulfide (TPS 32 of ELF) can be cited as a preferred example of polysulfide. Di-tert-nonylpolysulfide (TPS 37 of ELF) can also be cited. The sulfurizing agent is used diluted in a suitable solvent. The solvent selected can thus be one of the following solvents, which are used alone or mixed together:

- a light gasoline that boils at, for example, between about 60 and 95° C.,
- a hexane type gasoline that boils at between about 65 and 68° C.,
- an F-type gasoline that boils at between about 100 and 160° C.,
- a "white spirit" type gasoline that boils at between about 150 and 250° C.,
- or any fraction that may or may not contain hydrocarbon, equivalent to the above gasolines.

The SULFICAT process that is described above was improved after it was discovered that the qualities of the methods described in Patents EP-B-130,850 (U.S. Pat. No. 4,530,917) and EP-B-181254 (U.S. Pat. No. 4,719,195) of the applicant were further improved if the organic polysulfide was not used alone, but mixed in critical amounts with elemental sulfur.

This improved technique of the applicant is described in EP-B-448435 or U.S. Pat. No. 5,139,983. Elemental sulfur is used in the form of, for example, molten sulfur, sulfur powder, or sulfur flour, according to any suitable method, for example, the one described in the applicant's patent EP-B-153233.

The preceding processes were the object of another type of improvement by the applicant, which is described in EP-B-466 568 (U.S. Pat. No. 5,153,163) called "SURECAT" and relates to the pre-reduction of the catalyst accompanied by sulfurizing passivation.

In another process of the applicant, described in EP-B-564 317, the presulfuration of the catalyst is carried out either in the presence of at least one organic polysulfide, or in the presence of elemental sulfur, or by means of at least one organic polysulfide and elemental sulfur at the same time. Preferably, a mixture of at least one organic polysulfide and elemental sulfur is used. The solvent used is generally and preferably a white spirit or an equivalent solvent. An olefinic compound, particularly such as rapeseed oil, is also used.

It should be noted that other patents, and particularly U.S. Pat. No. 4,943,547 and U.S. Pat. No. 5,215,954, also relate to the presulfuration of catalysts by a method that makes it possible to incorporate elemental sulfur into the pores of the catalyst; but here the elemental sulfur penetrates the pores basically by melting or by sublimation.

SUMMARY OF THE INVENTION

This invention makes it possible to presulfide a refining catalyst or petrochemical catalyst ("hydroprocessing" catalyst) easily and efficiently by bringing this catalyst into contact with the elemental sulfur that is in the liquid state, i.e., used either in molten form or dissolved in a liquid (and no longer in solid state or in suspension in a liquid). This liquid or this liquid solution should thus be at a temperature of at least 120° C., preferably at least 125° C., before being brought into contact with said catalyst.

In this invention, a sulfur solution or liquid sulfur solution is therefore used. For the operation of bringing the elemental sulfur into contact with a catalyst, elemental sulfur is used alone or is combined with at least one suitable sulfur compound, and particularly at least one organic polysulfide or any other sulfur compound in which the sulfur can dissolve. If it is used alone, the elemental sulfur is first heated to above its melting point (around 119° C.). If it is used in combination with, in particular, an organic polysulfide, it is possible to conceive either heating it alone to above its melting point and then mixing it with at least one organic polysulfide which, for its part, is itself preheated to an adequate temperature so that by mixing this organic polysulfide with the molten elemental sulfur, the elemental sulfur does not crystallize and will therefore not be in suspension in the elemental sulfur-organic polysulfide mixture. It is necessary to be able to obtain a presulfuration solution that is completely liquid and generally clear or limpid, and preferably clear.

The liquid with an elemental sulfur base with or without a sulfur compound, for example, an organic polysulfide, is poured onto the catalyst to fill a portion of the pores of this catalyst. According to the invention, to stabilize the incorporation of sulfur into the pores of the catalyst, it is also suitable to introduce a stabilizing agent, which may or may not be dissolved in a solvent, into the catalytic compound. This solvent may be a white spirit, or any other petroleum fraction, for example, or other standard solvent.

In the case where the stabilizing agent is added at the same time as or after the addition of elemental sulfur, this agent for stabilizing sulfur, which may or may not be diluted in a solvent, is preferably heated to a temperature that preferably exceeds the melting point of elemental sulfur, above, e.g., 120° C., and more particularly above 125° C.

In the case where the stabilizing agent is added before the addition of elemental sulfur, this stabilizing agent can be added to the catalyst at any suitable temperature, for example, at ordinary temperature.

The invention is also characterized in that the stabilizing agent is selected from the group that consists of alcohols, polyalcohols, mercaptans, and polymercaptans, as well as from among compounds such as aldehydes, ketones, polyketones, ethers, acids (particularly unsaturated, polyunsaturated, saturated fatty acids), polyacids, esters, and preferably compounds with a boiling point of greater than 120° C.

When an alcohol or a mercaptan is used, the use of any organic molecule that has at least one alcohol group and/or at least one thiol group is understood.

As examples of suitable stabilizing agents, the following can be cited:

as alcohols, hexanols, heptanols, octanols, nonanols, decanols, dodecanols, and higher alcohols, linear alcohols or branched alcohols, diols or polyols and carbohydrates. As examples of diols or polyols, let us cite in particular:

glycols that are saturated or unsaturated, in alpha-position, beta-position, etc. . . , cyclic (such as terpinol), triols or glycerols (like glycerine and its equivalents), tetrols or erythritols (erythrites), pentols or pentitols, hexols or hexitols and higher polyols, carbohydrates (or sugars), particularly: the oses such as aldoses and ketoses (for example, glyceraldehyde and erythrulose, glucoses), diholosides,(saccharose, for example,) and mono, oligo, polysaccharides, i.e., polyosides. Glucose, fructose, saccharose and lactose are suitable agents.

as mercaptans (or thiol) and polymercaptans, the compounds that correspond to said alcohols where the OH group is replaced by the SH group, as aldehydes, the compounds that correspond to said alcohols where a terminal $CH_2OH$ group is replaced by a CHO group, as acids, the compounds that correspond to said alcohols where a terminal $CH_2OH$ group is replaced by a COOH group. Fatty acids can also be used.

as esters, the compounds that correspond to said alcohols where a terminal $CH_2OH$ group is replaced by a COOR group, with R being a radical that contains one or more carbon atoms (methyl, ethyl, etc. . . ); fatty acid esters can also be used.

as ketones, hexanones can be used with dodecanones or ketones of higher molecular weight.

as ethers, any compound that results from the dehydrating combination of two said alcohols or one said alcohol and another lighter alcohol such as methanol or ethanol (illustrative example: a methyl dodecyl ether) or two other lighter alcohols, such as methyl tert-butyl ether (MTBE) or methyl tert-amyl ether (TAME), and even cyclic ethers such as tetrahydrofuran or dioxane.

In a more detailed way, the invention therefore relates to a process for presulfuration of a refining catalyst or petrochemical catalyst (hydroprocessing catalyst) that comprises the introduction of liquid elemental sulfur or elemental sulfur that is dissolved in a liquid in a catalyst, with the introduction being done either at the same time as or after the introduction of the elemental sulfur into the catalyst (simultaneous introduction or later introduction of said agent relative to the introduction of elemental sulfur into the catalyst) of an agent for the stabilization of sulfur. In other words the invention comprises introducing liquid elemental sulfur or elemental sulfur dissolved a catalyst and at the same time or subsequently introducing a sulfur stabilizing agent. It is also possible, however, to bring the catalyst and the stabilizing agent into contact before impregnating the catalyst with elemental sulfur. This method is generally preferred.

This catalyst impregnation with elemental sulfur can be carried out by any method, for example, by bubbling, stirring, splashing or the like, by spraying (atomization) liquid sulfur on the catalyst, etc.

The liquid or dissolved elemental sulfur in at least one other liquid sulfur compound is introduced into the catalytic compound by bubbling or by spraying or any equivalent method.

Generally, as indicated above, the stabilizing agent is selected from the group that consists of alcohols, polyols, mercaptans, polymercaptans, aldehydes, ketones, acids (in particular fatty acids, which may or may not be saturated), esters, ethers, etc.

When the liquid in which the liquid elemental sulfur is diluted or in which the elemental sulfur is dissolved in an organic polysulfide or an equivalent compound, generally only a single liquid phase is seen; in particular, there is no separate molten sulfur phase.

A variant of the process according to the invention comprises preparing, first of all, a presulfuration liquid, preferably clear, containing either liquid elemental sulfur or a mixture of elemental sulfur and at least one sulfur compound, whereby the temperature of said presulfuration liquid is generally greater than 120° C.; it then comprises bringing this liquid into contact with said catalyst, with said catalyst also being brought into contact, simultaneously or later or before, with at least one sulfur stabilizing agent that is selected among the alcohols and the mercaptans and/or the other compounds that are indicated above (polyols, oses, etc. . . ).

When a mixture of elemental sulfur and a sulfur compound is used as a presulfuration liquid, the elemental sulfur and the sulfur-containing compound can each be heated separately before being mixed.

Likewise, when a mixture of elemental sulfur and a sulfurated compound is used as a presulfuration liquid, said elemental sulfur and said sulfurated compound can be heated together to a temperature of greater than 120° C.

The sulfurizing liquid can contain 20 to 100% by volume of liquid elemental sulfur (preferably 25 to 100%) and 0 to 80% (preferably 0 to 75%) of sulfur- containing compound.

In another variant of the process, said agent for stabilizing sulfur, which is preferably an alcohol or polyol or mono, oligo, or polysaccharide (i.e., ose), or sugar, etc.,. or a mercaptan, is brought into contact with the catalyst before or after (and preferably before) the latter has been brought into contact with said sulfurizing liquid.

As indicated above, the stabilizing agent can be used just as such, i.e., in non- diluted form, but it can also be used after being mixed or dissolved in a solvent.

Said sulfurizing liquid can then represent 1 to 100% or 2 to 50% by volume, preferably 4 to 40%, and more particularly 7 to 30%, of the overall solvent-sulfurizing liquid mixture. Said solvent can be a hydrocarbon.

It should be noted that to avoid recrystallization of elemental sulfur when it is brought into contact, and after it is brought into contact, with the catalyst, the contact is then made between the elemental sulfur and a catalyst which can itself have been preheated to a temperature that is greater than about 120° C., preferably about 125° C.

More specifically, (with this contact being carried out in any suitable container: reactor, furnace, etc.,), the contact temperature between the catalyst and the liquid elemental sulfur or elemental sulfur in solution (in another sulfur compound), for example, in an organic polysulfide, is between 120 and 300° C., or even between about 125° C. and 250° C.

Likewise, the contact between the catalytic compound and the stabilizing agent (used alone or mixed with another solvent) is also between 1200° C. and 250° C., or even between about 125° C. and 200° C. The temperatures and contact times are selected to facilitate as much as possible the impregnation and/or fixing of the sulfur in the pores of the catalyst. Furthermore, these two types of "contact" can, if necessary, then be extended optionally into another container (for example, another furnace) for the time required for suitable presulfuration. These contacts can advantageously be terminated between, for example, 160° C. and 400° C., for example, between 200° C. and 350° C. or 210° C. and 320° C.

Without further elaboration, it is believed that one, skilled in the art can, using the preceding description, utilize the present invention to its fullest extent. The following preferred specific embodiments are, therefore, to be construed as merely illustrative, and not limitative of the remainder of the disclosures in any way whatsoever.

In the foregoing and in the following examples, all temperatures are set forth uncorrected in degrees Celsius and unless otherwise indicated, all parts and percentages are by weight.

EXAMPLES

Example 1

Use of elemental sulfur and polysulfide as presulfurizing agents in combination with an iso-dodecyl alcohol type alcohol It is proposed that 150 g of a hydrodesulfuration catalyst that contains 4% by weight of CoO and 19% by weight of MoO3 on the alumina substrate be presulfurized. The presulfuration solution contains 33% by volume of liquid elemental sulfur (SE) and 67% by volume of TPS37 (organic polysulfide named di-tert-nonyl polysulfide, marketed by Elf Atochem). At 130° C., this mixture A is a perfectly clear solution. By contrast, Mixture B contains 50.1% by volume of white spirit, a heavy gasoline whose initial and final boiling points are, respectively, 180 and 270° C. and 49.9% by volume of iso-dodecyl alcohol or I-C120H (marketed by Exxon Chemicals France). The catalyst is impregnated at 130° C. by filling its pore volume consecutively with mixture A at 26.3% by volume, and then 15 minutes later with mixture B at 73.7% by volume. The solid that is thus impregnated is brought to a temperature of 250° C. for 2 hours to evaporate the solvent. The product that is obtained contains 7.7% by weight of sulfur and 11.1% by weight of carbon. This catalyst, which is called catalyst A hereinafter, is characterized, and the results and operating conditions are presented in Table 1. Loss due to ignition (LOI1) is determined after calcination at 500° C. under air for one hour. Stoichiometries ST1 and ST2 correspond, respectively, to the degrees of sulfuration compared to $MoS_2/Co_9S_8$ for the catalyst as is after sulfuration and after lixiviation treatment with boiling toluene that makes it possible to eliminate the soluble sulfur.

Example 2

Use of elemental sulfur and polysulfide as presulfurizing agents in combination with an alcohol such as a normal dodecyl alcohol 150 g of catalyst that was already used in Example 1 is consecutively impregnated at 130° C. with a solution A as in Example 1. Solution B is a mixture that contains 39% by volume of a white spirit, identical to the one in Example 1, and 61% by volume of normal dodecyl alcohol or n-C120H (marketed by Exxon Chemicals, France). The catalyst is impregnated at 130° C. by filling its pore volume consecutively with mixture A at 26.3% of volume, and then 15 minutes later with mixture B at 73.7% of volume. The solid that is thus impregnated is brought to 250° C. for 2 hours to evaporate the solvent. The product that is obtained contains 7.8% by weight of sulfur and 10.6% by weight of carbon. This catalyst is called catalyst B. The results of the characterization and the operating conditions are presented in Table 1.

Example 3

Use of elemental sulfur as a presulfurizing agent in combination with an alcohol such as iso-dodecyl alcohol 150 g of the catalyst that is already used in Examples 1–2 is consecutively impregnated at 130° C. with a presulfuration solution A that contains 100% by volume of elemental sulfur (SE). By contrast, Mixture B contains 40% by volume of white spirit, a heavy gasoline like the one used in Examples 1–2, and 60% by volume of 1- C12OH, as used in Example 1. The catalyst is impregnated at 130° C. by filling its pore volume consecutively with mixture A at 12% of volume, and then 15 minutes later with mixture B at 88% of volume. The solid that is thus impregnated is brought to 250° C. for two hours to evaporate the solvent. The product that is obtained contains 8.2% by weight of sulfur and 9.8% by weight of carbon. This catalyst, which is called catalyst C hereinafter, is characterized, and the results and operating conditions are presented in Table 1.

Example 4 (not according to the invention)

Use of elemental sulfur only as a presulfurizing agent 150 g of the catalyst that was already used in Examples 1–3 is consecutively impregnated at 130° C. with a solution A that contains 100% by volume of elemental sulfur (SE). By contrast, Mixture B contains 100% by volume of white spirit, a heavy gasoline like that used in Examples 1–3. The catalyst is impregnated at 130° C. by filling its pore volume consecutively with mixture A at 12% of volume, and then 15 minutes later with mixture B at 88% of volume. The solid that is thus impregnated is brought to 250° C. for 2 hours to evaporate the solvent. The product that is obtained contains 8.5% by weight of sulfur and 0.5% by weight of carbon. This catalyst, which is called catalyst D hereinafter, is characterized, and the results and operating conditions are presented in Table 1.

Example 5

Use of elemental sulfur and polysulfide as presulfurizing agents in combination with a mercaptan such as n-dodecyl mercaptan 150 g of the catalyst that was already used in Examples 1–4 is consecutively impregnated at 130° C. with a solution A, as in Examples 1–4, and a solution B. Solution B is a mixture that contains 50% by volume of a white spirit that is identical to the one that is used in Examples 1–4, and 50% by volume of n-dodecyl mercaptan (marketed by Elf Atochem). The catalyst is impregnated at 130° C. by filling its pore volume consecutively with mixture A at 26.3% of volume, and then 15 minutes later with mixture B at 73.7% of volume. The solid that is thus impregnated is then brought to 250° C. for two hours to evaporate the solvent. The product that is obtained contains 8.05% by weight of sulfur and 11.3% by weight of carbon. This catalyst is called catalyst E. The results of the characterization and the operating conditions are presented in Table 1.

Example 6

Use of elemental sulfur as a presulfurizing agent in combination with an alcohol such as glycerine or (1,2,3) propanetriol 150 g of the catalyst that was already used in Example 1 is consecutively impregnated at 130° C. with a solution A as in Example 1. Solution B is a mixture that contains 55% by volume of the distilled water and 45% by volume of glycerine (marketed by Elf Atochem). The catalyst is impregnated at 130° C. by filling its pore volume consecutively with mixture A at 11% of volume, and then 15 minutes later with mixture B at 89% of volume. The solid that is thus impregnated is brought to 250° C. for 2 hours to evaporate the solvent. The product that is obtained contains 8.0% by weight of sulfur and 6.6% by weight of carbon. This catalyst is called catalyst F. The results of the characterization and the operating conditions are presented in Table 1.

Example 7

Use of elemental sulfur as a presulfurizing agent in combination with a saccharose type alcohol 150 g of the catalyst that was already used in Example 1 is consecutively impregnated at 130° C. with a solution A as in Example 1. Solution B is a mixture that contains 67.7% by mass of distilled water and 33.3% by mass of saccharose (marketed by Eridania Beghin Say). The catalyst is impregnated at 130° C. by filling its pore volume consecutively with mixture A at 11.4% of volume, and then 15 minutes later with mixture B at 88.6% of volume. The solid that is thus impregnated is brought to 280° C. for 2 hours to evaporate the solvent. The product that is obtained contains 7.9% by weight of sulfur and 9.3% by weight of carbon. This catalyst is called catalyst G. The results of the characterization and the operating conditions are presented in Table 1.

TABLE 1

| Example | 1 | 2 | 3 | 4 | 5 | 6 | 7 |
| --- | --- | --- | --- | --- | --- | --- | --- |
| Catalyst | A | B | C | D | E | F | G |
| A) Sulfur source 1 (%) | SE; 33% vol. | SE; 33% vol. | SE; 100% vol. | SE; 100% vol. | SE; 33% vol. | SE; 100% vol. | SE; 100% vol. |
| Sulfur source 2 (%) | TPS37 67% vol. | TPS37 67% vol. | — | — | TPS37 67% vol. | — | — |
| B) White spirit (vol. %) | 50.1 | 39 | 40 | 100 | 50 | 55% | 67.7%* (weight) |

TABLE 1-continued

| Example | 1 | 2 | 3 | 4 | 5 | 6 | 7 |
|---|---|---|---|---|---|---|---|
| Additive (vol. %) | iC12OH 49.9% | nC12OH 61% | iC12OH 60% | nC12SH 0% | glycerine 50% | saccharose 45% | 33.3% (weight) |
| Mixed Addition B (% vol.) | 73.7 | 73.7 | 88 | 88 | 73.7 | 89% | 86.6% |
| T-impregnation (° C.) | 130 | 130 | 130 | 130 | 130 | 130 | 130 |
| T-drying (° C.) | 250 | 250 | 250 | 250 | 250 | 250 | 280 |
| % C1 | 11.1 | 10.6 | 9.8 | 0.5 | 11.3 | 6.6 | 5.3 |
| % S1 | 7.7 | 7.2 | 8.2 | 8.5 | 8.0 | 8.0 | 7.9 |
| % LOI1 | 18.9 | 18.5 | 16.5 | 8.8 | 17.9 | 16.1 | 12.8 |
| ST1 (%) | 95 | 96 | 98 | 93 | 97 | 95 | 91 |
| ST2 (%) | 90 | 92 | 94 | 56 | 95 | 95 | 88 |
| ΔH (l/g) | 0 | 0 | 0 | 120 | 0 | 0 | 0 |

*Water, in the case of saccharose.

The parameter ΔH, which is measured at 1 bar of hydrogen pressure (in a TG-ATD Setaram type device), gives an indication of the total heat that is generated during the activation of the catalyst that is preconditioned under hydrogen, as well as the kinetics of the reaction.

In Example 4 (not according to the invention), ΔH, which is measured, is located around 120 l/g. This indicates that the lack of stabilization of the sulfur corresponds to strong exothermy at the time of activation.

The preceding examples can be repeated with similar success by substituting the generically or specifically described reactants and/or operating conditions of this invention for those used in the preceding examples.

The entire disclosure of all applications, patents and publications, cited above and below, and of corresponding French application 96/13.798, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A process of presulfuration of a refining catalyst or petrochemical catalyst comprising treating said catalyst with a completely liquid presulfurization solution containing dissolved elemental sulfur, at the same time or subsequently or before introducing at least one sulfur stabilizing agent, which is a glycerol or a $C_6$-ose.

2. A process according to claim 1, wherein the elemental sulfur is dissolved in at least one other liquid sulfur compound and is introduced into the catalytic compound by bubbling by spraying by stirring.

3. A process according to claim 1, wherein the stabilizing agent further comprises an alcohol, diol, polyol, carbohydrate, mercaptan, polymercaptan, aldehyde, ketone, acid, ester or ether.

4. A process according to claim 1, wherein said liquid in which the elemental sulfur is dissolved is an organic polysulfide.

5. A process of presulfuration of a refining catalyst or petrochemical catalyst (hydro-processing catalyst) according to claim 1 comprising preparing a completely liquid sulfurizing solution, containing dissolved sulfur or a mixture of dissolved elemental sulfur and at least one sulfur compound, with the temperature of said sulfurizing liquid being greater than 120° C., then bringing this liquid into contact with said catalyst, with said catalyst also being brought into contact with a sulfur stabilizing agent that contains alcohols, diols, polyalcohols, carbohydrates, mercaptans, polymercaptans, aldehydes, ketones, acids, esters or ethers.

6. A process according to claim 1, wherein the sulfur compound is an organic polysulfide.

7. A process according to claim 1, wherein the contact of the sulfur is carried out with a catalyst that is itself preheated to a temperature that is greater than about 120° C.

8. A process according to claim 1, wherein the introduction of at least one agent for stabilizing sulfur is done at the same time as or after the introduction of the sulfur.

9. A process according to claim 1, wherein the introduction of at least one agent for stabilizing sulfur is done prior to the introduction of the sulfur.

10. A process according to claim 1, wherein the stabilizing agent further comprises an alcohol, mercaptan, polyol or sugar.

11. A process according to claim 1, wherein the stabilizing agent further comprises a polyol.

12. A process according to claim 1, wherein the stabilizing agent is a glycerol.

13. A process according to claim 1, wherein the stabilizing agent is a a $C_6$-ose.

14. A process according to claim 1, wherein the stabilizing agent further comprises a fatty acid.

15. A process according to claim 5, wherein the sulfurizing liquid is clear.

16. A process according to claim 1, wherein the sulfurizing agent contains 2–50% by volume of liquid elemental sulfur.

17. A process according to claim 7, wherein the catalyst is preheated to about 125° C.

* * * * *